United States Patent
Mathis et al.

(10) Patent No.: US 8,840,126 B2
(45) Date of Patent: *Sep. 23, 2014

(54) VEHICLE SUSPENSION SYSTEM

(75) Inventors: Ronald Christopher Mathis, Indianapolis, IN (US); Bradley W Jaeger, Charlottesville, VA (US)

(73) Assignee: Edison2 LLC, Charlottesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,244

(22) Filed: Feb. 25, 2012

(65) Prior Publication Data

US 2012/0175857 A1     Jul. 12, 2012

Related U.S. Application Data

(63) Continuation-in-part of application No. 12/765,567, filed on Apr. 22, 2010, now Pat. No. 8,152,184.

(51) Int. Cl.
*B60G 3/02* (2006.01)
*B60G 3/20* (2006.01)

(52) U.S. Cl.
CPC .............. *B60G 3/20* (2013.01); *B60G 2204/30* (2013.01); *B60G 2200/18* (2013.01)
USPC ...... 280/124.113; 280/124.125; 280/124.128; 280/124.129; 280/93.512

(58) Field of Classification Search
USPC ......... 280/93.512, 124.11, 124.113, 124.116, 280/124.117, 124.125, 124.128, 124.129, 280/124.13, 124.153, 124.154
See application file for complete search history.

(56) References Cited

U.S. PATENT DOCUMENTS

| | | | | |
|---|---|---|---|---|
| 2,082,620 A | * | 6/1937 | Ellefsen | 267/230 |
| 2,087,299 A | * | 7/1937 | Pribil | 16/44 |
| 2,155,521 A | | 4/1939 | Zavarella | |
| 2,241,217 A | * | 5/1941 | Peeters | 280/124.127 |
| 2,271,304 A | * | 1/1942 | Mulholland | 16/44 |
| 2,644,699 A | * | 7/1953 | Weiertz et al. | 280/5.508 |
| 4,168,082 A | * | 9/1979 | Hendrickson | 280/405.1 |

(Continued)

FOREIGN PATENT DOCUMENTS

FR          846448 A      9/1939
WO     2007026199 A1    3/2007

OTHER PUBLICATIONS

Extended European Search Report; European Patent Application No. 11772387.4, based on PCT Patent Application Serial No. PCT/US2011/028114, mailing date Nov. 11, 2013, 8 pages.

*Primary Examiner* — Ruth Ilan
*Assistant Examiner* — Barry Gooden, Jr.
(74) *Attorney, Agent, or Firm* — Thomas, Karceski & Karmilovich, PC

(57) ABSTRACT

A structurally efficient vehicle suspension system capable of being isolated from the main vehicle structure by being housed within a vehicle's wheel thereby reducing risks of injury during a crash and permitting advantageous redesign of suspension geometry. In the primary embodiment of this invention, the essentially longitudinal links providing wheel travel are outboard of the steering. The upper and/or lower suspension links may be arranged so as to form either a solid triangular-like structure or a "wishbone" form having two separate arms. In addition, the spring/damper unit of the suspension can be configured in a number of different embodiments variously using telescopic dampers, coil springs, rotary dampers, rubber springs, air springs, torsion bars, bell cranks linked to pushrods or pullrods and leaf springs. The spring/damper unit may also be housed in an appropriately enlarged kingpin axis carrier.

20 Claims, 11 Drawing Sheets

(56) References Cited

U.S. PATENT DOCUMENTS

| | | | |
|---|---|---|---|
| 4,815,759 A * | 3/1989 | Imai et al. | 280/21.1 |
| 4,919,441 A * | 4/1990 | Marier et al. | 280/21.1 |
| 6,257,604 B1 * | 7/2001 | Laurent et al. | 280/124.127 |
| 6,634,654 B2 * | 10/2003 | Mackle et al. | 280/5.521 |
| 6,783,137 B2 * | 8/2004 | Nagreski et al. | 280/93.512 |
| 6,789,810 B2 * | 9/2004 | Strong | 280/124.128 |
| 7,434,823 B2 * | 10/2008 | Robinson | 280/124.153 |
| 7,644,938 B2 * | 1/2010 | Yamada | 280/86.758 |
| 2008/0100021 A1 | 5/2008 | Yamada | |
| 2010/0052289 A1 * | 3/2010 | Frey et al. | 280/442 |

\* cited by examiner

Axis of Travel

Axis of Travel

VEHICLE SUSPENSION SYSTEM

CROSS-REFERENCES TO RELATED APPLICATIONS

This application is a continuation-in-part of U.S. Ser. No. 12/765,567, filed on Apr. 22, 2010, now U.S. Pat. No. 8,152,184 which is incorporated herein by reference in its entirety.

TECHNICAL FIELD

The subject invention relates generally to the field of suspension systems for automotive vehicles. More specifically, the system positions all of the moving parts of a suspension system either inside of or immediately adjacent to each wheel of the vehicle enabling advantageous reshaping of the vehicle.

BACKGROUND OF THE INVENTION

Known conventional suspension systems often suffer from one or more problems that individually and/or collectively restrict the design, utility, economy and safety of the vehicles in which they are used. There are many designs which can be considered "conventional" suspension systems, but there are five principal variations.

The first is the Wishbone design which consists of multiple predominantly transverse members ("links") with their inboard (chassis end) pivot axes aligned or nearly so with the vehicle's direction of travel. The links are connected at their outboard end to an "upright" that in turn carries the wheel. Wishbone suspension is conventionally seen as the best solution because, when designed well, it offers desirable geometric characteristics. This design is used most in very high performance/value cars but a combination of its relative complexity (and therefore high cost) and space requirements prevent higher utilization in ordinary passenger vehicles.

The second is the Strut design which is commonly used in low to mid-range passenger vehicles because of its relative economy of manufacture. Strut-type suspension consists of a predominantly planar transverse member to carry lateral and longitudinal loads and a predominantly vertical member to handle vertical loads. For the suspension to move, the vertical member has to be telescopic, this sliding function normally being performed by the damper. While such combining of purpose and function is desirable for economy of manufacture, they are accompanied by the disadvantages of compromised geometry and the imposition of side loads on the damper.

The third is the Beam design which comes is two basic varieties: live and dead. A live beam axle is one that provides drive to its wheels, a typical example being a pickup truck rear axle. Dead beam axles provide no drive and are often used at the front of heavy duty vehicles such as semi tractors and busses. Beam axles are cheap to manufacture but have numerous disadvantages including not allowing independent wheel motion, high unsprung weight and, because the whole axle moves with suspension travel, they take up a lot of room.

The fourth is the Leading/Trailing Link design which was once fairly common but is now used much less frequently. This was the design used for the front suspension of the original Volkswagen Beetle vehicle. Disadvantages include the absence of camber compensation for roll, difficulty of arranging bump-steer free steering and large size.

The last is the Swing Arm design which consists of a single substantially transverse member with its inboard pivot axis substantially aligned with the vehicle's direction of travel. This is the simplest type of independent suspension. Disadvantages include its necessarily short length causing awkwardly large camber change with the attendant gyroscopic action and its proclivity for undesirable jacking effects. The jacking effect of the Corvair's swing arm rear suspension is illustrated on the cover of Ralph Nader's book, Unsafe At Any Speed.

There are numerous subtypes of the above-mentioned suspension designs such as, for example, semi-trailing links or the deDion arrangement, that combine elements of more than one primary suspension type or at least mitigate some of their worst characteristics. These variations are common knowledge to any expert in suspension design.

Therefore, it is clear that a fundamental problem in designing any automotive suspension system is counterbalancing conflicting requirements such as cost, weight, packaging constraints and geometric characteristics. What is required is a suspension system which provides previously unavailable combinations of desirable characteristics while, at the same time, enabling manipulation of individual geometric settings incorporated into a vehicle without generating conflicts between such settings.

In addition, where and how a vehicle's suspension is mounted has a large bearing on the safety consequences of the overall design. For example, conventional wishbones are strong, slender pieces that terminate close to the vehicle's occupants with the attendant possibility in a crash of injury through penetration into the passenger compartment. Even the very common strut suspension requires a large notch in the car's construction which results in two main failings. Firstly, it is structurally inefficient leading to undesirably high vehicle weights and, secondly, the re-entrant corner required to house the wheel and its suspension tends to trap the wheel in a collision. This last point is significant: the wheel acts as a very stiff barrier tending to cause high peak decelerations (increasing the chance of occupant injury) and energy is not dissipated by shedding components.

Another important reason for adopting a suspension system differing from those already known in the art is to facilitate reshaping the vehicle to improve the rate of fuel consumption. Current passenger vehicle aerodynamics have been optimized to the point that it is difficult to tell the difference between brands. Further aerodynamic improvements of any appreciable magnitude will require a new aerodynamic approach and vehicles of substantially different shape and appearance to those currently sold. This requirement for new vehicle shape will render traditional suspension systems obsolete.

SUMMARY OF THE INVENTION

This invention relates to a suspension system for use in vehicles wherein all moving parts of the suspension are isolated from the main structure of the vehicle by being positioned either inside of or immediately adjacent to a wheel. A suspension assembly for a vehicle wheel is provided in which the wheel has a known axis of travel and the vehicle is connected to each suspension assembly by a transverse beam A king pin axis is attached to the transverse beam and a steering carrier assembly pivotally attached to the king pin axis. A steering link track rod is further movably attached to the steering carrier assembly. A spring/damper unit having a sprung end and an unsprung end is attached on its sprung end to the king pin axis. At least one upper suspension link is oriented along its length generally parallel to the axis of travel of the vehicle and has a pivot axis generally perpendicular to the axis of travel of the vehicle. Each upper suspension link is pivotally attached on a first sprung end to the steering carrier assembly. At least one lower suspension link is oriented along its length generally parallel to the axis of travel of the vehicle and is spaced below and away from any upper suspension link. Each lower suspension link has a pivot axis generally perpendicular to the axis of travel of the vehicle and is pivotally attached on a first sprung end to the steering carrier assembly. Finally, a wheel carrier is attached by a first bearing assembly to the second unsprung end of each upper suspension link and by a second bearing assembly to the second unsprung end of each lower suspension link.

A primary object of this invention is to permit the most desirable geometric characteristics of a suspension to be packaged more tightly than in any other suspension design.

Another object of this invention is to offer much greater overall vehicle design freedom than any comparable suspension design.

A further object of this invention is to allow other desirable but previously difficult to achieve vehicle design characteristics such as light weight and more ideal streamlining to be incorporated into the vehicle.

Yet another object of this invention is to offer the possibility of improved vehicle crash safety.

An additional object of this invention is to retain the ability to drive the steering wheels in either a front wheel drive or four wheel drive mode while still retaining the other advantages provided by the disclosed suspension system.

Still a further object of this invention is to offer the possibility, if desired, to substantially independently set, adjust and tune longitudinal, transverse and steering geometry.

Still another object of this invention is to enable configuration of the vehicle with single axis bearings, depending on design choices made.

Yet an additional object of this invention is to minimize impingement on vehicle interior space resulting from the suspension system.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE INVENTION

The system of this invention is applicable to steered and non-steered suspensions and may be used either at a vehicle's front or rear wheels. The following description assumes a front axle, steered suspension.

Figure 1:
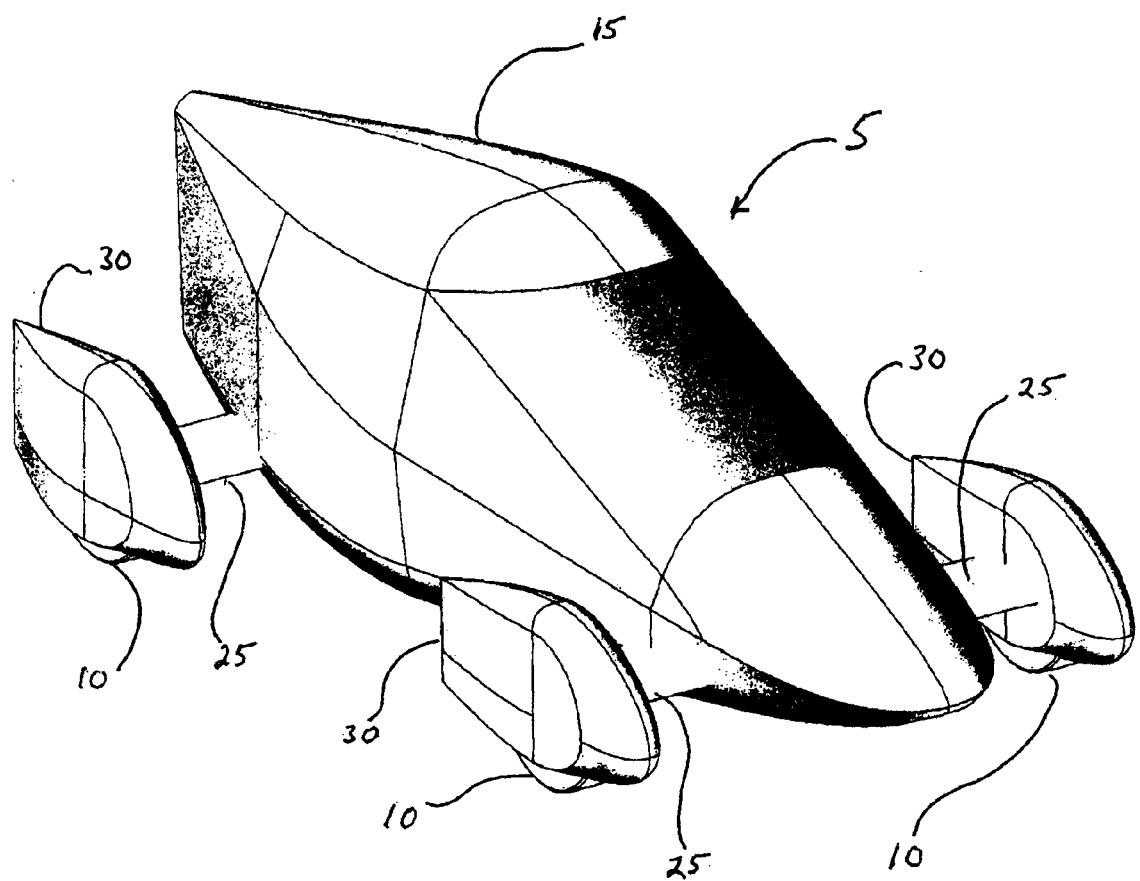
FIG. 1 is a perspective view of an automotive vehicle body employing a suspension system constructed according to the principles of this invention.

FIG. 1 provides a perspective view of the exterior of a vehicle 5 employing the suspension system of this invention. Tires 10 are positioned outboard from the vehicle's main body structure 15. Each tire 10 is mounted on a wheel 20 which is not visible in FIG. 1. In the novel system of this invention all moving suspension components are positioned close to or inside of an actual wheel 20. The moving components are, in turn, attached to the vehicle's main structure 15 with a rigid, relatively inflexible transverse beam 25, the shape of which may be straight or assume another configuration, as desired. Each tire 10 and wheel 20 assembly is surrounded by a cowling 30 of minimized cross section to facilitate air flow and thereby reduce aerodynamic drag.

Figure 2:
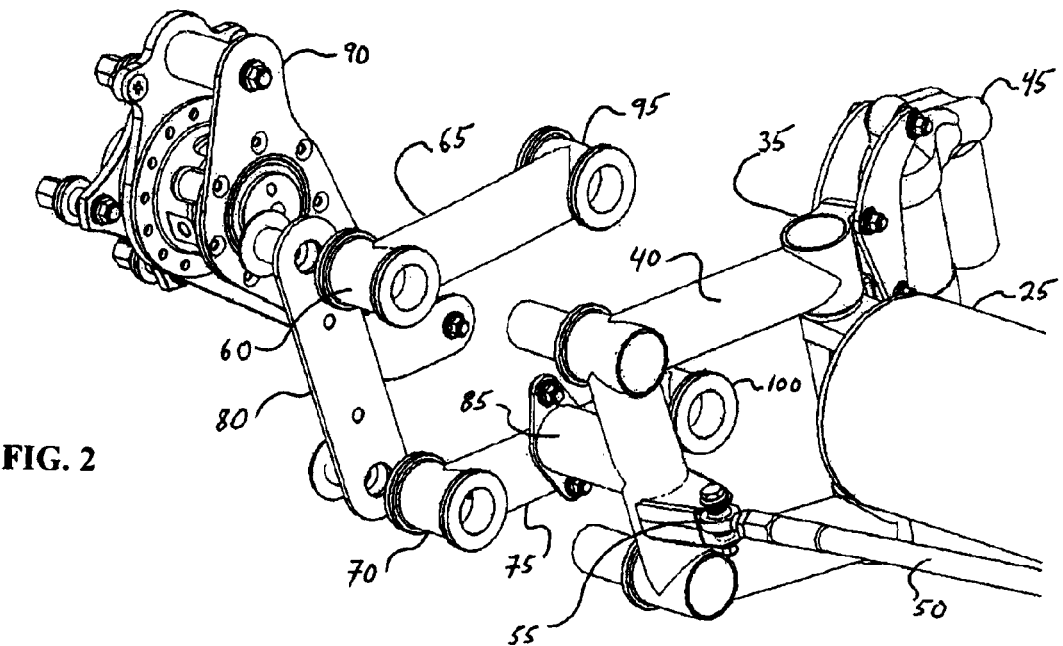
FIG. 2 is a perspective inboard view from the back looking forwards of a vehicle of the disassembled components of a suspension system embodying the principles of this invention.

FIG. 2 presents an inboard perspective angled view from the front end of a vehicle looking forwards at the main disassembled components of a preferred embodiment of a suspension system constructed according to the principles of this invention. In this disclosure, a front axle steered suspension is being described. Therefore, the positions from which views illustrated in the various figures are described are relative to a front axle of a vehicle. In this embodiment, the steering axis is inboard of the suspension such that the whole suspension is involved in steering the vehicle. In a second embodiment, steering of the vehicle occurs outboard of the suspension system which is a configuration advantageously adopted in the event the suspension system is employed on a driving axle. In the first embodiment, transverse beam 25 is connected to and terminates at king pin axis 35 which is typically angled from the vertical to provide castor and king pin inclination. Steering carrier assembly 40 is attached to and pivots on king pin axis 35 as determined by the position of steering link track rod 50 and swivel 55 to which track rod 50 is attached. The sprung end of spring/damper unit 45 is preferentially attached to king pin axis 35 but may be attached to some other sprung part of the car's structure, while the unsprung end of spring/damper unit 45 may be attached either to wheel carrier assembly 90, discussed below, or to one of the fore/aft links. Springs and dampers are very ordinary automotive art. For convenience and clarity, a concentric spring/damper unit is shown but the invention's function is independent of the exact spring and damper combination/arrangement chosen. Upper suspension link 65 and lower suspension link 75 pivot on steering carrier 40, respectively, at bearings 60 and 70. Bearings 60 and 70 are typically stabilized by shear plate 80, although use of such a plate is not mandatory. The stability of plate 80 may be enhanced by means of attachment to bracket bar 85 running from steering carrier assembly 40. Bearings 60 and 70 may be comprised of a single bushing or, more usually, multiple closely-spaced bushings which pivot on the sprung part of vehicle 5. In the interests of higher stiffness in heavily loaded applications, bearings 60 and 70 may have the base between their left and right elements expanded. If expanded far enough, suspension links 65 and 75 would then assume a triangular "wishbone" shape, as described below. The angular and positional relationship of the working axes of bearings 60 and 70 determine the substantially transverse geometry (roll center, camber change, etc.) of the suspension. Wheel carrier assembly 90 joins suspension links 65 and 75 to the wheel mounts, respectively, via first bearing assembly 95 and second bearing assembly 100 which are located at the unsprung end of links 65 and 75. The positional, angular and length relationship of links 65 and 75 determine the substantially longitudinal geometry (anti-dive, etc.) of the suspension. Note that in FIG. 2, there are only two fore/aft links, 65 and 75. It is possible, and may in some circumstances be desirable, to have more than two fore/aft links joining steering carrier 40 to wheel carrier 90 for reasons such as deliberately inducing bump steer. Furthermore, depending on the exact application, bearings with more than one axis of rotation, e.g. spherical bushings, and/or compliance, e.g. rubber bushings, may be required as bearings 60, 70, 90 and 95 and whatever bearings may be at the ends of any fore/aft links beyond links 65 and 75 which may be optionally incorporated in the suspension structure.

Figure 3:
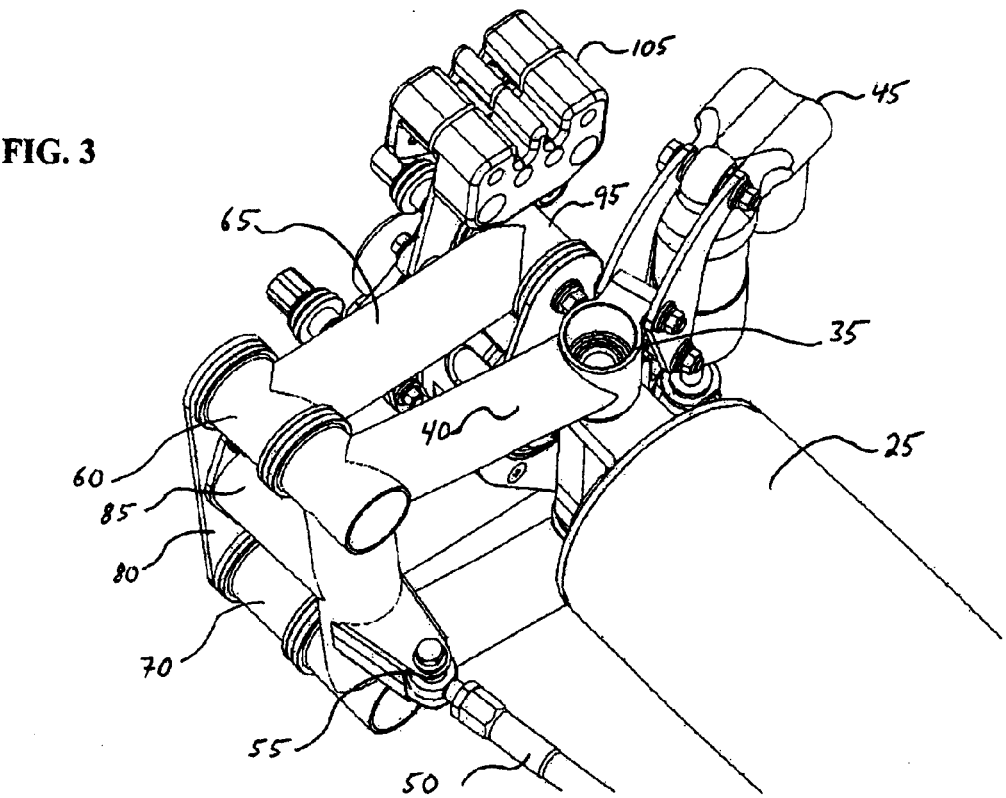
FIG. 3 is a perspective inboard view from the back looking forwards of a vehicle of the assembled components of a suspension system embodying the principles of this invention.
Figure 4:
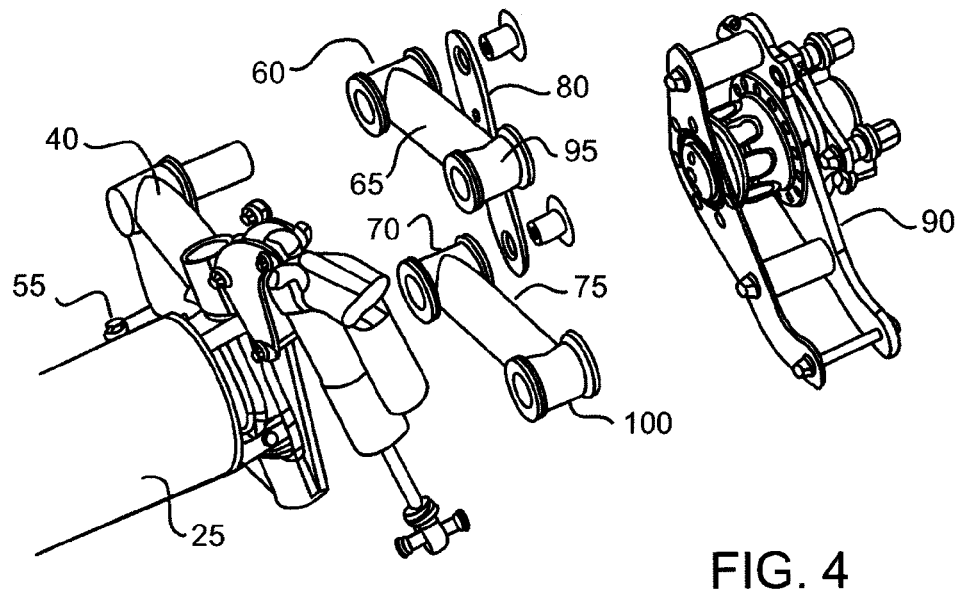
FIG. 4 is a perspective inboard view from the front looking rearwards of a vehicle of the disassembled components of a suspension system embodying the principles of this invention.
Figure 5:
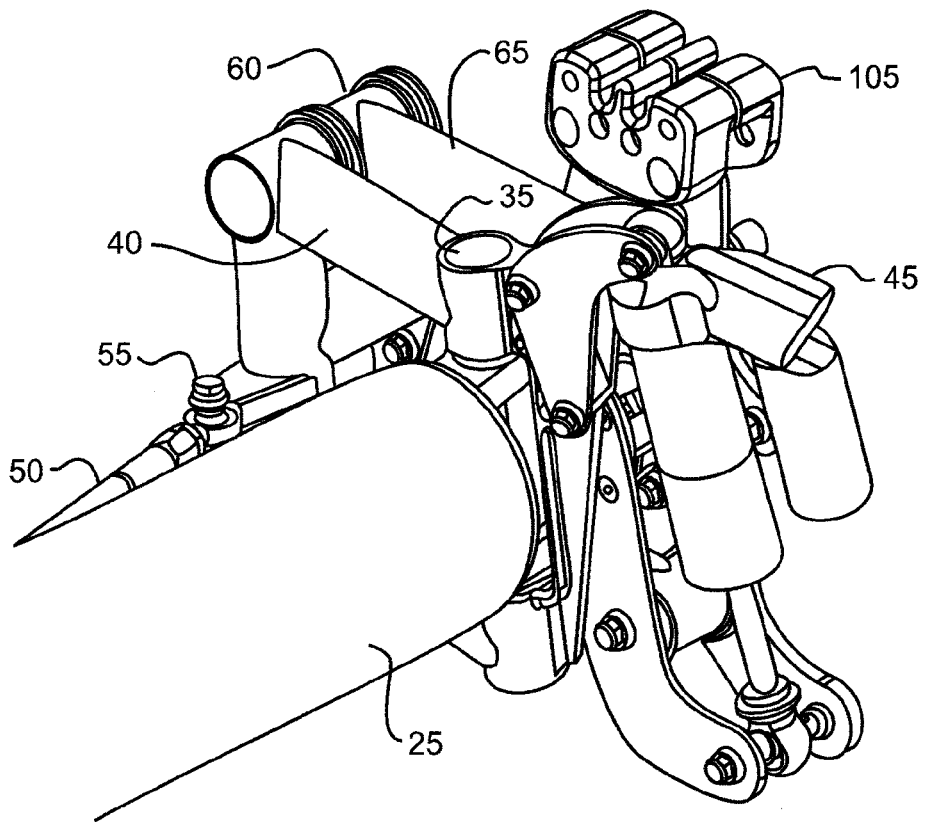
FIG. 5 is a perspective inboard view from the front looking rearwards of a vehicle of the assembled components of a suspension system embodying the principles of this invention
Figure 6:
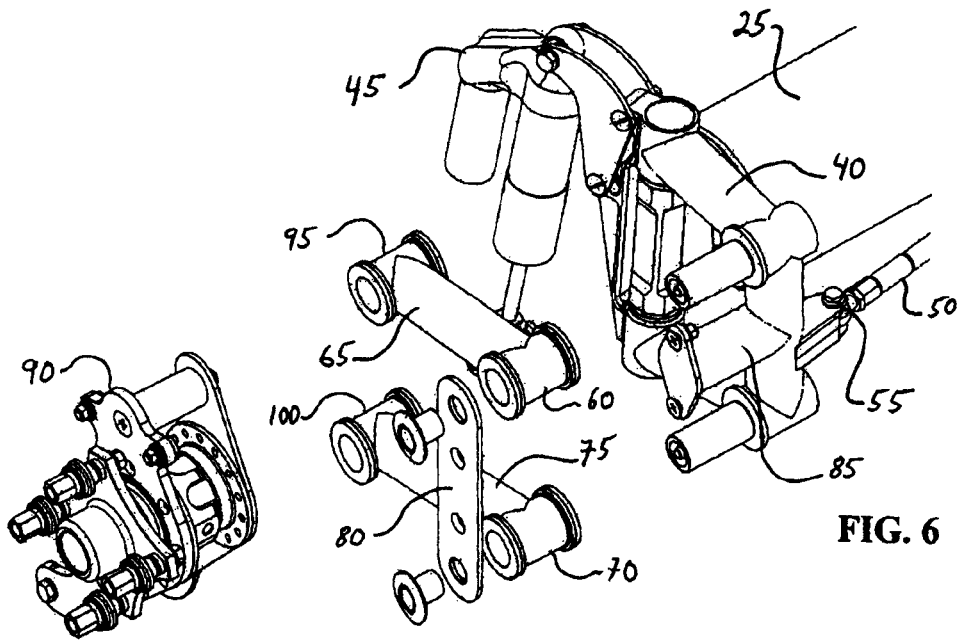
FIG. 6 is a perspective outboard view from the rear looking forwards of a vehicle of the disassembled components of a suspension system embodying the principles of this invention.
Figure 7:
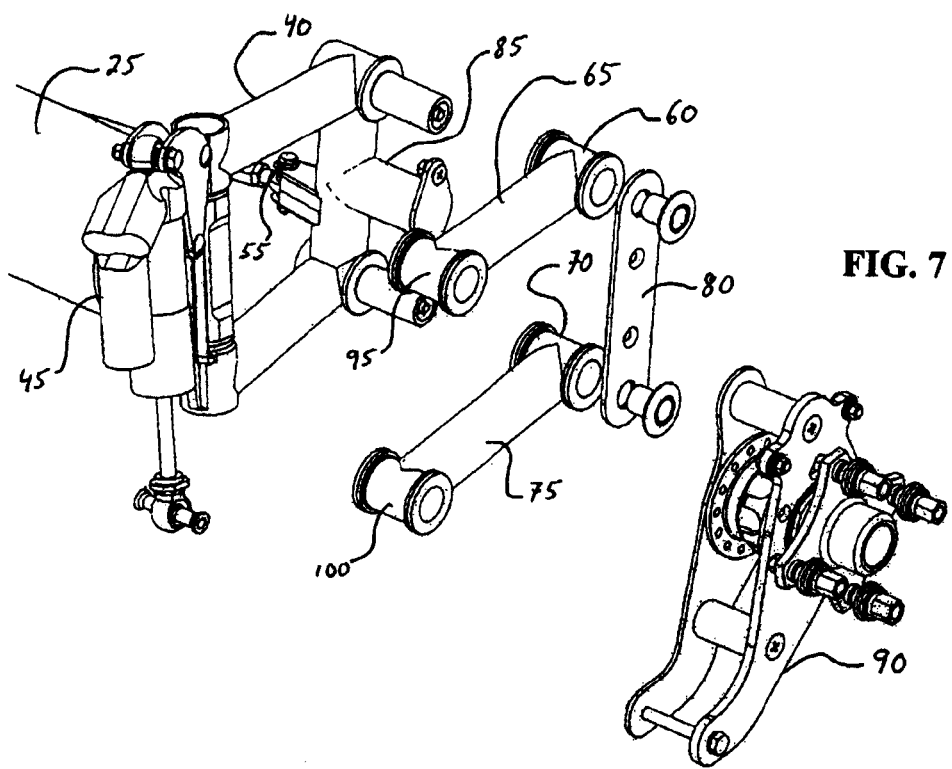
FIG. 7 is a perspective outboard view from the front looking rearwards of a vehicle of the disassembled components of a suspension system embodying the principles of this invention
Figure 8:
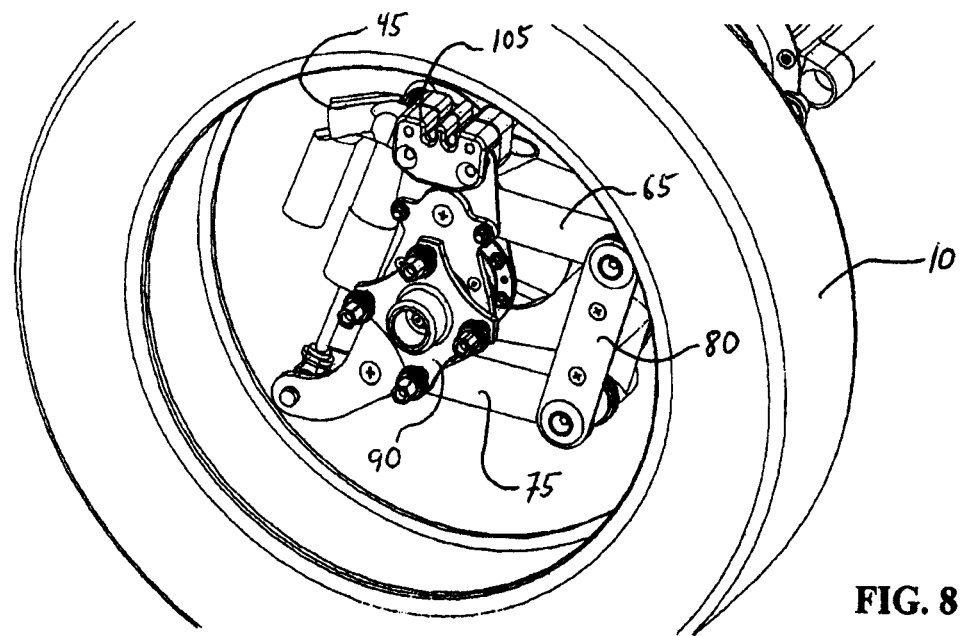
FIG. 8 is a perspective outboard view of the assembled components of a suspension system embodying the principles of this invention.
Figure 9:
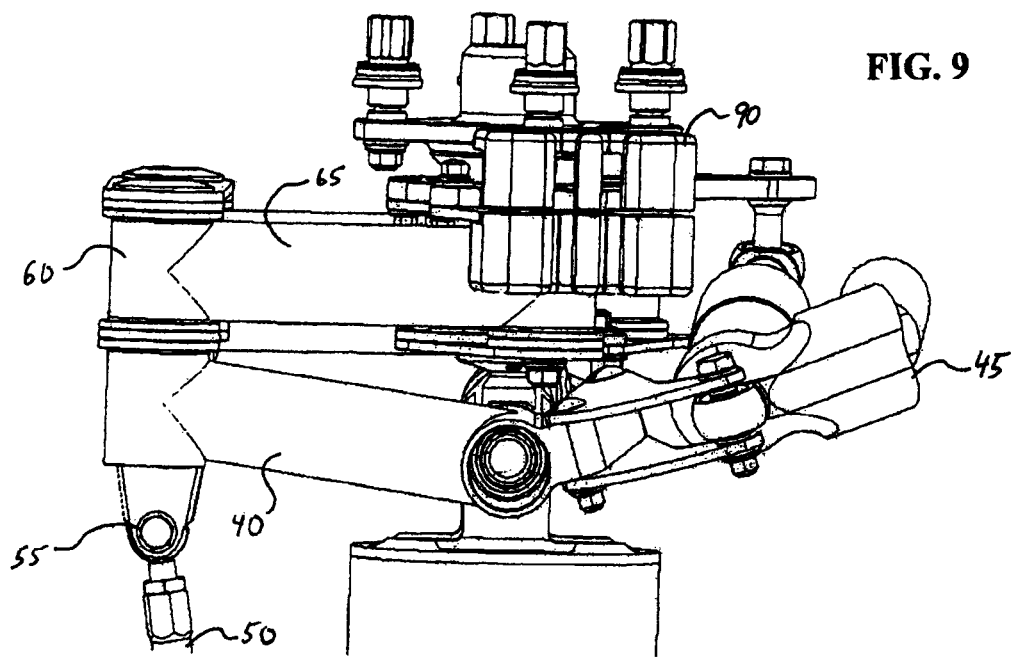
FIG. 9 is an overhead view of the assembled components of a suspension system embodying the principles of this invention.
Figure 10:
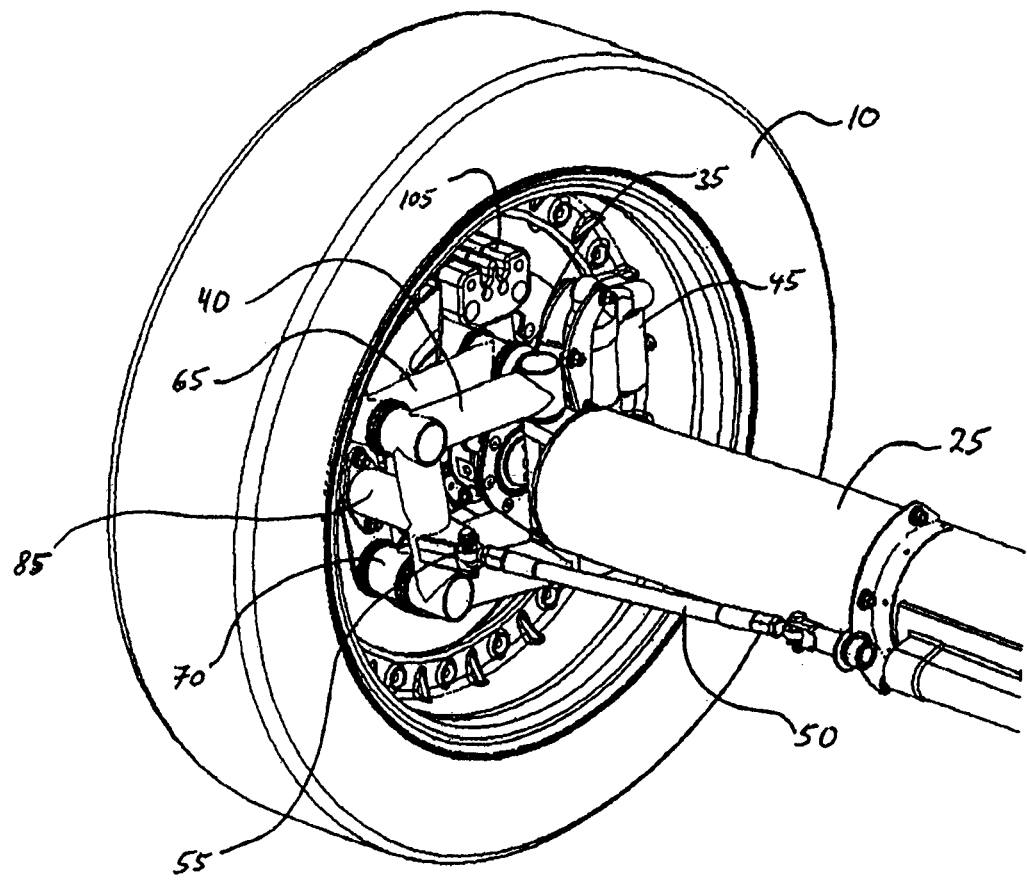
FIG. 10 is a perspective inboard view from the rear looking forwards of a vehicle of the assembled components of a suspension system embodying the principles of this invention as it would appear when installed within the wheel rim of a wheel structure.

FIG. 3 provides a further inboard perspective angled view from the rear end of a vehicle looking forwards at the assembled components of a preferred embodiment of a suspension system constructed according to the principles of this invention. FIG. 4 is a perspective inboard view from the back of a vehicle of the disassembled components of a suspension system embodying the principles of this invention. FIG. 5 is a perspective inboard view from the front of a vehicle of the assembled components of a suspension system embodying the principles of this invention. Brake caliper 105 is added to the view of FIG. 5. FIG. 6 is a perspective outboard view from the rear of a vehicle of the disassembled components of a suspension system embodying the principles of this invention. FIG. 7 is a perspective outboard view from the front of a vehicle of the disassembled components of a suspension system embodying the principles of this invention. FIG. 8 is a perspective outboard view of the assembled components of a suspension system embodying the principles of this invention with the road wheel omitted for clarity. FIG. 9 is an overhead view of the assembled components of a suspension system embodying the principles of this invention. FIG. 10 is a perspective inboard view from the rear of a vehicle of the assembled components of a suspension system embodying the principles of this invention as it would appear when installed within the wheel rim of a wheel structure.

Figure 11:
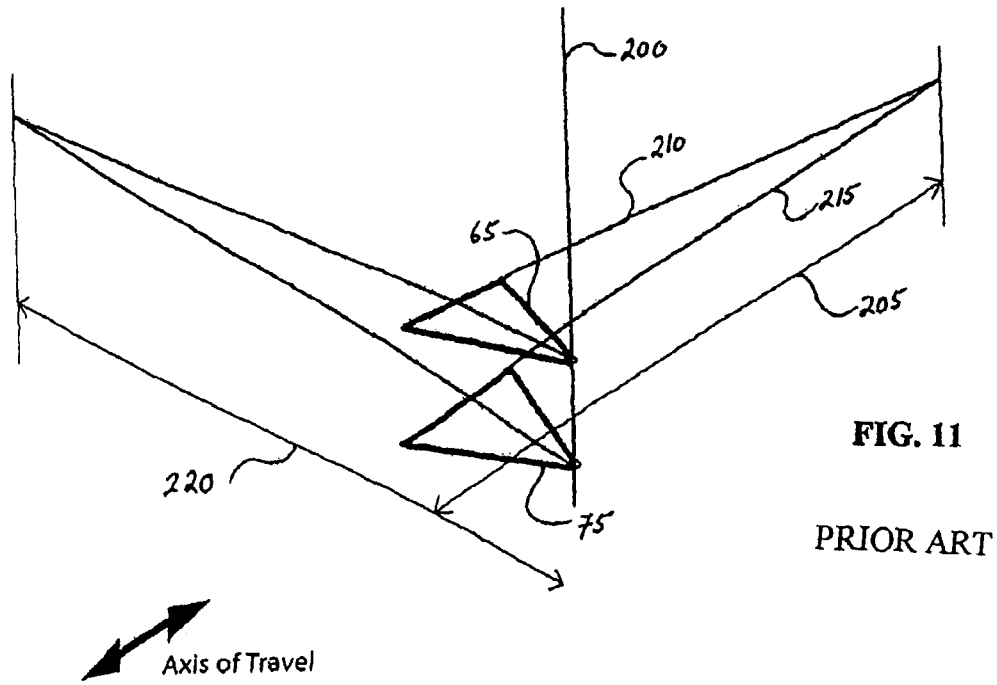
FIG. 11 illustrates the relative axes and pivot links of a conventionally known wishbone suspension.
Figure 12:
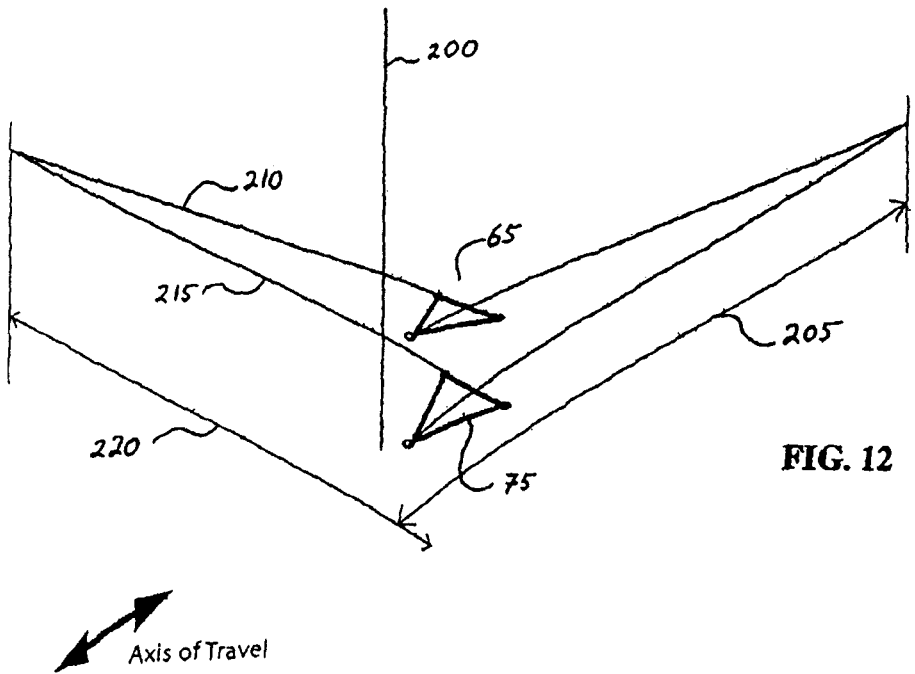
FIG. 12 illustrates the relative axes and pivot links of a suspension configuration embodying the principles of this invention in which steering is accomplished at the inboard end of the steering links.
Figure 13:
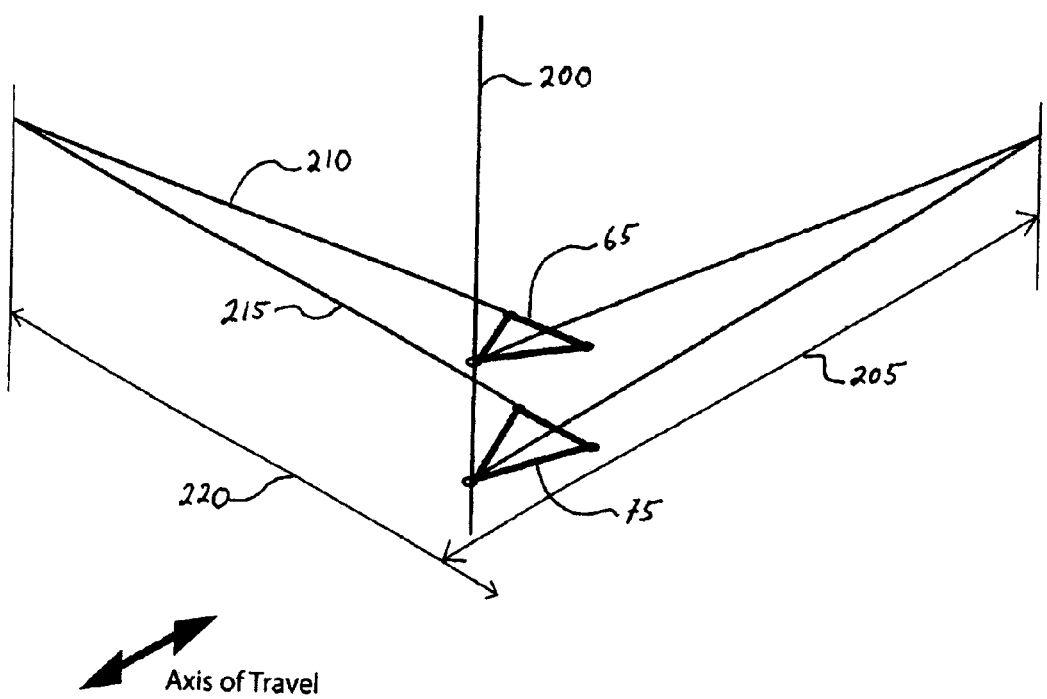
FIG. 13 illustrates the relative axes and pivot links of a suspension configuration embodying the principles of this invention in which steering is accomplished at the outboard end of the steering links.

By implementing the suspension system disclosed herein, the functional location of the vehicle's suspension link pivot axes are rotated approximately 90 degrees when compared with conventionally known wishbone suspensions. This is best demonstrated by initial reference to FIG. 11 in which the relative axes and pivot links of a conventionally known wishbone suspension are shown. Steering axis 200 is perpendicular to one end of upper link 65 and lower link 75. The virtual longitudinal link length 205 runs parallel with the axis of travel of the vehicle indicated by the arrow. Notwithstanding the effects of camber or toe, the axis of travel for each wheel is an axis parallel to the plane formed by a longitudinal center cross-section of that wheel across the diameter of that wheel. Thus, since the front wheels steer in the typical vehicle having front and rear wheels, the front and rear wheels may be pointing in different directions at certain points in time such as, for example, when the vehicle is turning and may therefore have different respective axes of travel. For purposes of this disclosure, the virtual longitudinal link length is a longitudinal distance set by the suspension's layout and geometry that most greatly controls the longitudinal radius of the wheel's path as it moves in reaction to a bump or in rebound. Upper link pivot axis 210 and lower link pivot axis 215 run parallel to longitudinal link length 205 and may be slightly inclined towards each other at their outer ends during the travels of the wheel at an angle corresponding to first bearing assembly 95 and second bearing assembly 100 so that their respective longitudinal axes would converge at a distant point termed the instant center. The angle of inclination is between 0 and 45 degrees with a preferable maximum of 30 degrees. Virtual swing axle length 220 runs perpendicularly to virtual longitudinal link length 205. For purposes of this disclosure, the virtual swing axle length is a transverse distance set by the suspension's layout and geometry that most greatly controls the transverse radius of the wheel's path as it moves in reaction to a bump or in rebound. When wheel 20 encounters a bump or moves in rebound after a bump, the distance from the instant center, which is where the axes of upper link 65 and lower link 75 would meet in space were they to be extended, is the radius described by the wheel as it moves up and down. That distance/radius is, depending on whether it is transverse or longitudinal, the virtual swing axle length or the virtual longitudinal link length. The effect of adopting the suspension principles of this invention are displayed in FIGS. 12 and 13 which correspond to the two suspension configurations discussed above. FIG. 12 presents the relative axes and pivot links of a suspension configuration embodying the principles of this invention in which steering is accomplished at the inboard end of the steering links. Steering axis 200 is again substantially vertical but typically somewhat inclined to provide castor and king pin inclination, while virtual longitudinal link length 205 runs parallel with the axis of travel of the vehicle indicated by the arrow and virtual swing axle length 220 runs perpendicularly to virtual longitudinal link length 205. However, upper link pivot axis 210 and lower link pivot axis 215 now run parallel to virtual swing axle 220 and their convergence point defines its length. A similar outcome is demonstrated in FIG. 13 which presents the relative axes and pivot links of a suspension configuration embodying the principles of this invention in which steering is accomplished at the outboard end of the steering links as in the second embodiment. In this latter embodiment, first bearing assembly 95 and second bearing assembly 100 would be a multiple axis bearing such as a spherical bearing so as to permit wheel carrier assembly 90 to both travel up and down and turn to steer as the wheel is in motion. Furthermore, swivel 55 and track rod 50 would be attached to wheel carrier assembly 90 to control steering angle.

In an alternative arrangement, the front and rear suspension on one side of vehicle 5 could be attached to a longitudinal structure that joins the pivot points together rather than to transverse beam 25.

Figure 14:
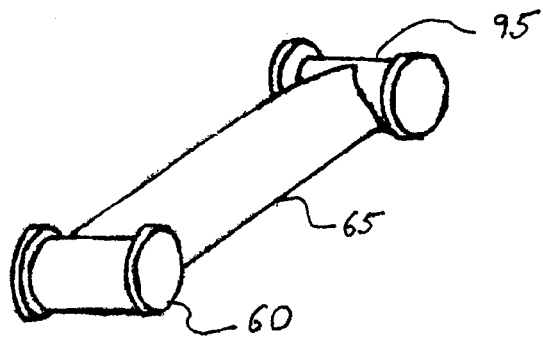
FIG. 14 is a perspective view of one of the suspension links shown in FIG. 2.
Figure 15:
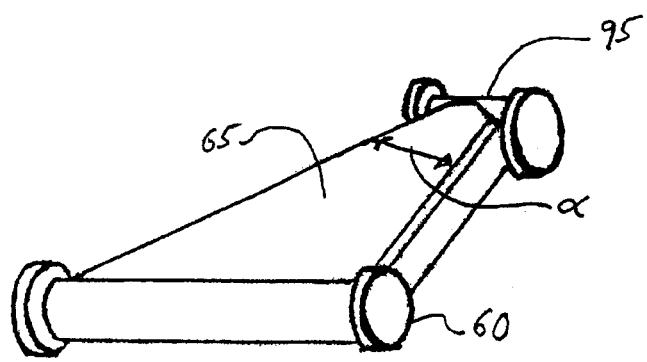
FIG. 15 is a perspective view of a first alternative embodiment of a suspension link.
Figure 16:
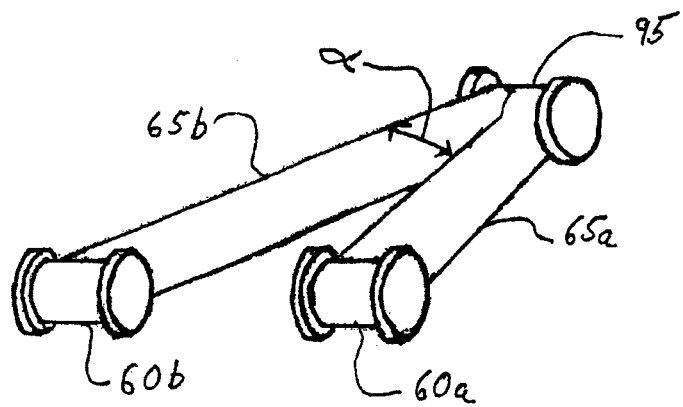
FIG. 16 is a perspective view of a second alternative embodiment of a suspension link.

Alternative embodiments for suspension links 65 and 75 are shown in FIGS. 14, 15 and 16 in which suspension links 65 and 75, originally shown in FIG. 2, are rearranged so as to assume a triangular "wishbone" shape. This arrangement would be particular useful to provide higher stiffness in heavily loaded applications. The arrangement of one suspension link 65, previously illustrated as part of FIG. 2 herein, is separately displayed in FIG. 14. Under normal operation, a vehicle tire sees loads in the vertical, longitudinal, and transverse directions. These loads seen by the tire and wheel are transmitted to wheel carrier assembly 90. From the wheel carrier assembly, the loads are seen by spring/damper unit(s) 45 and first bearing assemblies 95 and 100 on the ends of links 65 and 75. Because of the positioning of links 65 and 75, side-load forces in the transverse direction result in a moment about bearings 60 and 70, which are positioned opposite of bearings 95 and 100 on links 65 and 75. This moment can cause lateral movement and flex in links 65 and 75. This moment becomes even more of a concern as the cornering loads and weight of the vehicle increase.

One way to constrain the flex and to reduce the lateral movement of links 65 and 75 is to widen the attachment point to the steering carrier 40 at bearings 60 and/or 70 and to make the suspension link a single, solid structure. This results in a stronger, triangular-shaped link and provides a more stable attachment with bearings 60 and/or 70. Such an arrangement of links 65 and/or 75 is illustrated in FIG. 15. Either link 65 or link 75 or both of them could be configured as shown in FIG. 15. Another way to reach a similar result is with a "wishbone" structure, as illustrated in FIG. 16. In this configuration, link 65 is split into two separate arms, 65a and 65b, and bearing 60 is split into two separate bearings (60a, 60b). The same structure could be used for link 75 (i.e., 75a and 75b) and bearing 70 (i.e., 70a and 70b). Again, either link 65 or link 75 or both of them could be configured as shown in FIG. 16. Bearings 60a and 60b (or 70a and 70b if looking at the lower link) still attach to the same pivot axis as bearing 60 (or 70) would. In both FIGS. 15 and 16, the angle $\alpha$ formed between opposing sides of each link is greater than 0 degrees but not more than 90 degrees, but preferably between 1 degree and 50 degrees. This configuration allows for similar strength and stability as seen in the structure of FIG. 15, but results in a lighter weight structure and more options for packaging with more space created in the middle of the link.

While a concentric spring/damper unit is disclosed in detail, there are many other combinations/arrangements available. For example, the disclosed layout assumes a concentric spring/damper unit. Because of packaging, it could be advantageous to separate the spring and damper into separate units. This will also result in them needing individual mounting positions. The originally disclosed layout is for a telescopic damper and coil spring. There are many other types of springs and dampers that could be used with the in wheel suspension disclosed such as, but not limited to, rotary springs, torsion springs, rubber springs, flextures, air springs, leaf springs, coil springs, rotary dampers, telescopic dampers and linear dampers. What is important is that the suspension layout incorporates at least one form of a spring and at least one form of a dampening device to control the wheel movement.

The preferred embodiment of the suspension described earlier assumes that the spring and damper have one sprung end and one unsprung end of the unit. With certain spring/damper arrangements, these ends could be partially sprung or unsprung. If the spring/damper unit were attached to the upper link 65 on one end and to the lower link 75 on the other end, such that there is a difference in motion ratio between the upper and lower links, both ends would be partially sprung. In a second version of this embodiment, the spring and damper could be separated into individual units and along upper link 65 and lower link 75 such that they had different motion ratios. In this embodiment, the spring and damper would not be co-incident or co-axial.

When using a telescopic damper, coil spring, or any other type of spring or damper that works by movement along a linear axis, the spring and/or damper can be positioned such that either they compress in a bump (when the wheel moves upwards) or such that they extend when a bump is encountered. Any combination of these arrangements will work with the disclosed suspension.

Another way to control the vertical movement is with a torsion spring and a rotary damper. In this embodiment of the suspension, the damper and spring need rotational movement instead of linear movement. The natural points where this occurs in the disclosed suspension is at bearing 60 and 70 where upper link 65 attaches to steering carrier 40 and the lower link 75 attaches to steering carrier 40. In one version of this, the torsion spring could be mounted to upper link 65 and the rotary damper could be mounted to lower link 75. It is also possible to reverse this layout with the torsion spring being mounted to lower link 75 and the rotary damper being mounted to upper link 65. It is also entirely possible to have both the torsion spring and the rotary damper attached to the upper link 65 or to have both the torsion spring and the rotary damper attached to the lower link 75.

Figure 17:
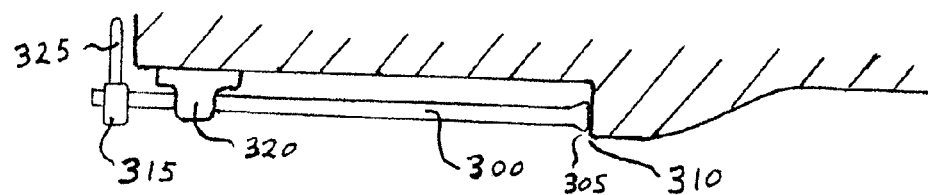
FIG. 17 is a side view of a spring/damper unit in which a torsion bar is used as a spring.

Another possibility is to use a torsion bar as the spring. FIG. 17 illustrates this configuration. In this embodiment, one end 305 of torsion bar 300 needs to be fixed at a substantially rigid chassis location 310 such that it cannot rotate. The other end 315 of torsion bar 300 needs to be free to rotate. The twisting of the torsion bar acts like a spring. The torsion bar may be supported near its opposing end, for example by a bracket or other support mechanism 320, in a manner that permits that end to rotate. An arm 325 needs to be attached to end 315 of torsion bar 300 that is also free to rotate. This arm will help translate the vertical suspension travel into a moment about the torsion bar. The end of the arm opposite where it is attached to the torsion bar needs to be connected to either upper link 65, lower link 75, or wheel carrier 90 either directly or through an additional connecting linkage. This additional linkage will allow for steering movement. In this case, a rotary damper, telescopic damper, or any other dampening device to help control the vertical wheel movement can be used. The damper can be attached in any of the disclosed positions mentioned above or below.

Figure 18:
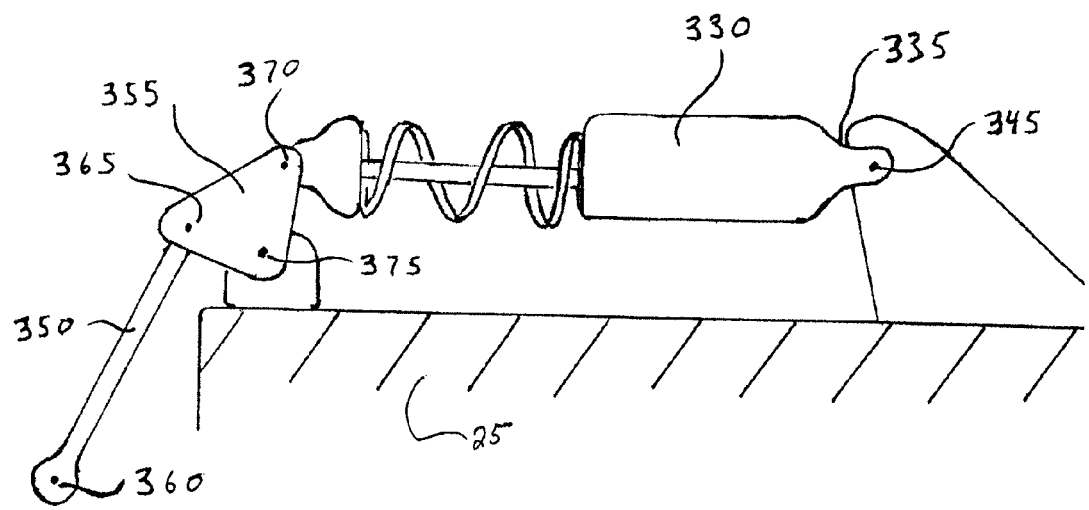
FIG. 18 if a side view of a spring/damper unit mounted to, but outside of, an axle structure.

In yet a further embodiment of the suspension, an example of which is shown in FIG. 18, spring/damper 330 can be rotationally mounted on a first end 335 anywhere at a substantially rigid location on the vehicle chassis or on the vehicle's transverse beam axle structure 25, such as to an attachment point 345 which is outside of the wheel and hence more accessible. This embodiment relies on first movement transmittal means such as a pushrod or pullrod 350 to actuate a movable second movement transmittal means such as a bell crank 355 to translate mostly vertical wheel movement to mostly linear movement along the longitudinal axis of the spring/damper. The location of this axis depends on where exactly the spring and/or damper is placed. In this configuration, a first end 360 of pushrod or pullrod 350 would be movably connected to wheel carrier 90, upper link 65, or lower link 75 with the opposing end movably connected to bell crank 355 at first connection point 365. Second connection point 370 of bell crank 355 is connected to spring/damper unit 330 or another rod that actuates the spring/damper unit. Bell crank 355 is attached to the vehicle at a primary rotational axis such as third connection point 375 that allows the bell crank to rotate. Bell crank 355 can be attached to the vehicle on transverse beam axle structure 25, the chassis, the primary body of the vehicle, or any other structure that is not completely unsprung. While a bell crank is described in this embodiment, any device or means that translates the vertical wheel movement to another axis can be used as a second movement transmittal means.

Figure 19:
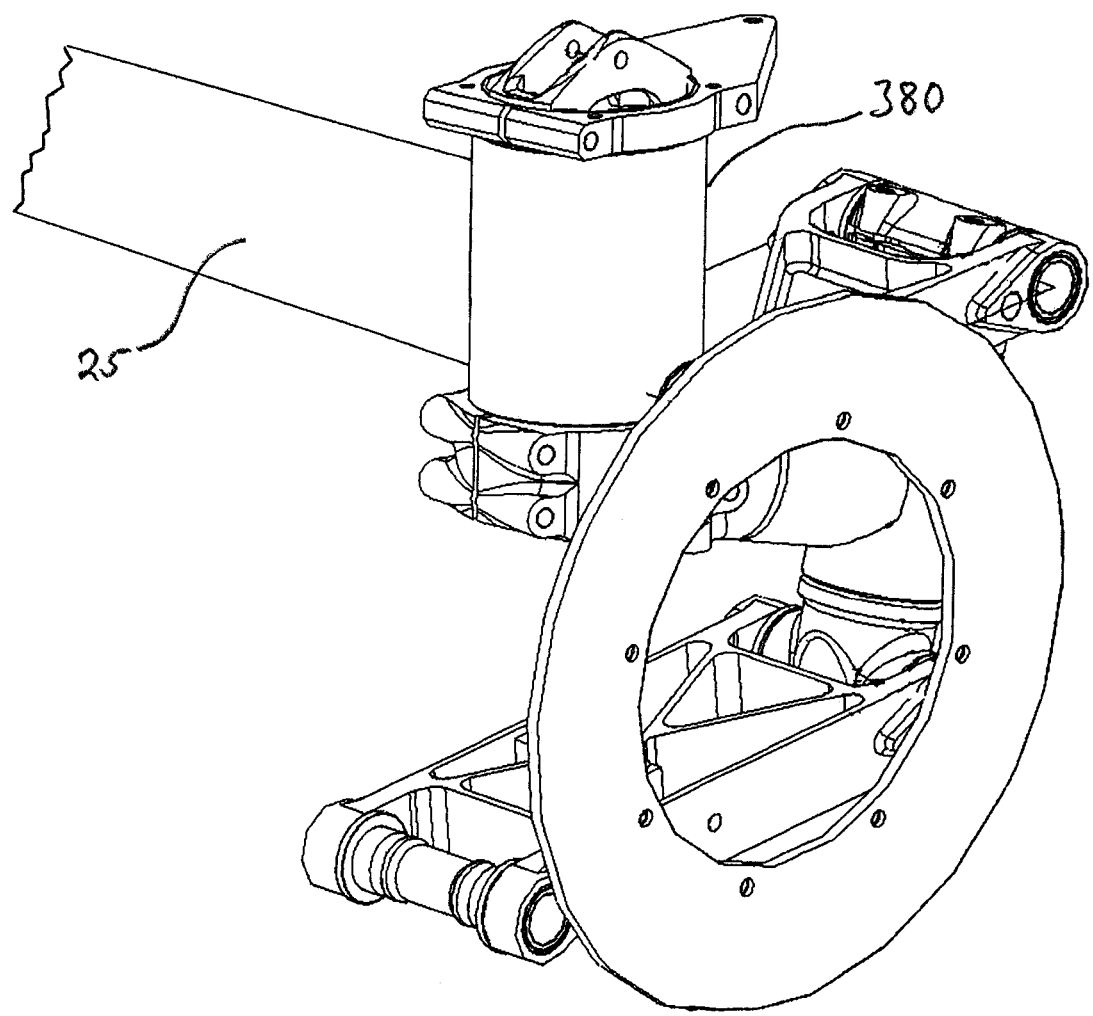
FIG. 19 is a perspective view of a kingpin carrier enlarged so as to house a spring/damper unit.

In yet one more version of the suspension, the spring/damper unit can be positioned substantially in line with kingpin axis 35. A perspective illustration of this embodiment as viewed from outside of the car looking inwardly towards a wheel is presented in FIG. 19. In this embodiment, the kingpin housing 380, which may also be referred to as a kingpin carrier or kingpin attachment, is enlarged sufficiently to house a spring/damper unit inside of kingpin carrier 380. The spring and/or damper unit(s) are attached to the kingpin carrier on a first end, with the second end being connected to upper link 65, lower link 75, or wheel carrier 90. The spring and/or damper unit(s) positioned inside of the kingpin carrier will attach to the kingpin on a mounting structure. This mounting structure is preferably on the highest portion of kingpin carrier 380 so that the axle is higher than the wheel center and, additionally, to facilitate access to the mount. However, the structure can also be mounted on the lowest or middle portion of kingpin carrier 380, the inside of the carrier or could potentially be kingpin carrier 380 itself with provisions for a bolt, screw, key or any other device to attach the unit(s) to kingpin carrier 380. The preferred mounting point for the spring/damper unit(s) will vary with the desired axle height and position. While it is possible to place both the spring and damper in line with kingpin axis 35, it is also possible to position just the spring or just the damper in line with or substantially in line with the kingpin. In this embodiment, the other unit can be placed in any of the positions described above or below in this document.

In another version of the suspension, one or more leaf springs, each having two ends, could be used instead of a coil or torsion spring. In this embodiment, the leaf spring can substitute for either the upper link 65, or the lower link 75, or both of the links. The benefit of only substituting one of the links is that the other link can be used to increase the lateral stability of the suspension. In yet another embodiment using a leaf spring, the leaf spring can be positioned parallel to the axle, oriented transversely across the car. In this embodiment, the leaf spring is attached at one or more points along its middle portion to an axle or the vehicle chassis structure, leaving only its ends free to move up and down. The leaf spring ends would need to be attached to wheel carrier 90, to upper link 65, or to lower link 75 on both the right and left suspension either directly or indirectly by using an additional linkage like a pushrod or pullrod, although other types of linkage devices can also be used. This connection point would have to allow for pivoting to conform to steering movement if the steering took place inboard of the vertical movement. If the steering takes place outside of the vertical wheel movement, the attachment of the leaf spring to upper link 65 or lower link 75 becomes much simpler. In another embodiment, separate leaf springs could be used for each corner's suspension. In this embodiment, a portion of one side of the leaf spring would be fixed to the vehicle with the other end of the leaf spring free to move with suspension travel and connected to either wheel carrier 90, upper link 65, or lower link 75. It is also possible to position the leaf spring longitudinally. If this approach is employed, the leaf spring would attach to the vehicle either in front of or behind the suspension links. The other end of the leaf spring would attach either directly or indirectly to wheel carrier 90, upper link 65, or lower link 75 for the respective wheel. This connection point is similar to the transverse leaf spring positioning and would have to allow for pivoting to conform to steering movement if the steering took place inboard of the vertical movement. If the steering takes place outside of the vertical wheel movement, the attachment of the leaf spring to upper link 65 or lower link 75 is again much simpler.

The suspension system disclosed herein provides new and previously unavailable freedom to the vehicle designer and engineer to electively change vehicle design and tune kinematics without sacrificing the normal wishbone suspension's geometric advantages. The following advantages are provided by the disclosed system and structure:

1. Since wheels 20 are positioned outside and away from the vehicle's main body structure 15, as shown in FIG. 1, the shape of the main body structure 15 can be modified to obtain optimal aerodynamic properties, light weight and crash-worthiness.

2. Wheels 20 are part of a regime of jettisonable components that dissipate collision energy and reduce injury-causing peak accelerations.

3. Since the suspension system may be packaged entirely, or almost entirely, inside each wheel 20, the aerodynamic properties of vehicle 5 are enhanced by the placement of cowling 30 which is designed to have a minimized drag over each wheel 20.

4. Transverse beam 25 that connects each wheel assembly to the vehicle's main structure 15 can be any shape chosen to achieve desired aerodynamic properties, crash-protection properties, ground clearance and interior space.

5. Furthermore, by mounting each transverse beam 25 outside the vehicles' main structure 15, each axle's suspension can be assembled on the beam before attachment to the car, providing manufacturing efficiencies and cost reductions. Also, in the event of a crash, beam 25 becomes part of the energy absorption and dissipation sequence of the vehicle.

6. Since the suspension links must be designed primarily for appropriate strength and stiffness, they are necessarily least able to be designed for optimum crush properties. By placing such components outside the vehicle's main structure 15 and a long way from the occupants of the vehicle, as is done in the suspension disclosed herein, the possibility of injuries in the event of a collision are minimized.

7. The suspension disclosed above achieves multiple ends by reorienting a wishbone suspension by approximately 90 degrees so that the longitudinal and transverse functions of the linkage are swapped between the link pivot axis layout and the moving link geometry. This novel arrangement contrasts with current suspensions wherein transverse geometry is defined by the absolute and relative positions of the link pivot axes, and longitudinal geometry is defined by the layout of the links that permit and define wheel vertical travel.

8. Another important difference between ordinary leading/trailing link suspensions and the advance of this new design is the possibility of utilizing unequal length, non-parallel links along the car and non-parallel operating axes across the car. This is analogous to the acknowledged advantages of unequal length non-parallel wishbone (sometimes called "Short-Long Arm") suspension arrangements over equal length parallel links.

9. Additionally, this new arrangement offers the possibility of mounting the operating links outboard of the steering so that steering and suspension geometry are mutually substantially independent. Separating the steering and suspension actions removes bump steer as a design issue and greatly simplifies the steering action if the axle beam, for whatever reason, is something other than a straight member.

The foregoing invention has been described in terms of a preferred embodiment. While multiple variations of link shapes, attachment points, spring positions, damper positions, steering axis positions, structures, and various embodiments of the suspension are described in this document, it is possible to combine any one of the options presented with others mentioned in the description. Moreover, it will be apparent to those skilled in the art that various modifications and variations can be made to the disclosed apparatus and method without departing from the scope or spirit of the invention and that legal equivalents may be substituted for the specifically disclosed elements of the invention. The specification and examples are exemplary only, while the true scope of the invention is defined by the following claims.

What is claimed is:

1. A suspension assembly for a vehicle wheel, comprising:
    a substantially rigid mounting structure attached to a vehicle, wherein the vehicle has an axis of travel and a steering direction and wherein the steering direction is alterable with respect to the axis of travel;
    a steering carrier assembly pivotally attached to the mounting structure, wherein pivotal movement of the steering carrier assembly alters the steering direction and wherein vertical movement of the vehicle wheel occurs outboard of the steering carrier assembly;
    a steering link track rod attached to the steering carrier assembly to control the steering direction;
    at least one upper suspension link with an upper link length generally parallel to the axis of travel of the vehicle, the at least one upper suspension link having a pivot axis generally perpendicular to the axis of travel of the vehicle, being pivotally attached on a sprung end to the steering carrier assembly, and enabling the vertical movement of the vehicle wheel;
    at least one lower suspension link with a lower link length generally parallel to the axis of travel of the vehicle, the at least one lower suspension link being spaced below and away from the at least one upper suspension link, having a pivot axis generally perpendicular to the axis of travel of the vehicle, being pivotally attached on a sprung end to the steering carrier assembly, and enabling the vertical movement of the vehicle wheel;
    a wheel carrier assembly pivotally attached to the unsprung end of the at least one upper suspension link and to the unsprung end of the at least one lower suspension link;
    at least one spring connected between the mounting structure, the steering carrier, or a rigid structure for the at least one spring and the wheel carrier assembly, the at least one upper suspension link, or the at least one lower suspension link; and
    at least one damper connected between the mounting structure, the steering carrier, or a rigid structure for the at least one damper and the wheel carrier assembly, the at least one upper suspension link, or the at least one lower suspension link;
    wherein steering geometry is substantially independent of suspension geometry.

2. The suspension assembly of claim 1, wherein the at least one spring is at least one selected from a group consisting of rotary springs, torsion springs, rubber springs, flextures, air springs, leaf springs, and coil springs.

3. The suspension assembly of claim 1, wherein the at least one damper is at least one selected from a group consisting of rotary dampers, telescopic dampers, and linear dampers.

4. The suspension assembly of claim 1, wherein the at least one spring is a torsion spring and the at least one damper is a rotary damper, wherein the torsion spring is mounted to the at least one upper suspension link at the steering carrier and the rotary damper is mounted to the at least one lower suspension link at the steering carrier, the rotary damper is mounted to the at least one upper suspension link at the steering carrier and the torsion spring is mounted to the at least one lower suspension link at the steering carrier, both the torsion spring and the rotary damper are mounted to the at least one upper suspension link at the steering carrier, or both the torsion spring and the rotary damper are mounted to the at least one lower suspension link at the steering carrier.

5. The suspension assembly of claim 1, wherein:
    the at least one spring comprises a torsion bar having a first end attached to the mounting structure or the rigid structure on the vehicle and a second end that is free to rotate;
    an arm having a first end attached to the second end of the torsion bar and a second end attached either directly or indirectly to one of the at least one upper suspension link, the at least one lower suspension link, or the wheel carrier; and
    the at least one damper is connected between any one selected from the group consisting of the mounting structure and the wheel carrier, the mounting structure and the at least one upper suspension link or the at least one lower suspension link, the steering carrier and the wheel carrier, and the steering carrier and the at least one upper suspension link or the at least one lower suspension link.

6. The suspension assembly of claim 1, wherein the at least one upper suspension link, the at least one lower suspension link, or both the at least one upper suspension link and the at least one lower suspension link comprises at least one leaf spring, attached to the steering carrier at a first end and the wheel carrier at a second end.

7. The suspension assembly of claim 1, wherein the at least one spring is at least one leaf spring oriented parallel to a longitudinal axis of the vehicle, a first end of the at least one leaf spring being attached to the rigid structure in front of or behind the at least one upper suspension link and the at least one lower suspension link, a second end of the leaf spring being attached directly or indirectly to the wheel carrier, the at least one upper suspension link, or the at least one lower suspension link.

8. The suspension assembly of claim 1, wherein at least one leaf spring is connected between the rigid structure for the at least one spring and the wheel carrier assembly, the at least one lower suspension link, or the at least one suspension upper link, with the at least one leaf spring running parallel to an axle of the vehicle.

9. The suspension assembly of claim 1, wherein at least one of the at least one upper suspension link or the at least one lower suspension link is a solid triangular structure having three sides forming three vertices, one vertex being located where the at least one of the at least one upper suspension link or the at least one lower suspension link attaches to the wheel carrier assembly, the vertex forming an angle α greater than 0 degrees but not more than 90 degrees.

10. The suspension assembly of claim 9, wherein the angle α is at least 1 degree but not more than 50 degrees.

11. The suspension assembly of claim 1, wherein at least one of the at least one upper suspension link or the at least one lower suspension link is a wishbone-shaped structure having two arms joined to form a vertex where the at least one of the at least one upper suspension link or the at least one lower suspension link attaches to the wheel carrier assembly, the vertex forming an angle α greater than 0 degrees but not more than 90 degrees.

12. The suspension assembly of claim 11, wherein the angle α is at least 1 degree but not more than 50 degrees.

13. The suspension assembly of claim 1, wherein the at least one spring and the at least one damper together comprise a spring/damper unit and the suspension assembly further comprises:
 a first movement transmitter having a first end connected movably to the wheel carrier, the at least one upper suspension link, or the at least one lower suspension link for translating vertical wheel movement to linear movement; and
 a second movement transmitter movably connected to a second end of the first movement transmitter and further movably connected to the mounting structure and also to the spring/damper unit for translating movement of the first movement transmitter into linear movement along the longitudinal axis of the spring/damper unit.

14. The suspension assembly of claim 13, wherein the first movement transmitter is either a pushrod or a pullrod and the second movement transmitter is a bell crank.

15. The suspension assembly of claim 1, further comprising a king pin housing sized large enough to locate at least one of the at least one spring or the at least one damper therein.

16. The suspension assembly of claim 15, wherein both the at least one spring and the at least one damper are positioned in line with one another and inside the king pin housing.

17. The suspension assembly of claim 1, wherein at least one leaf spring is attached along a mid-portion to the rigid structure for the at least one spring, runs parallel to an axle of the vehicle, and is connected at each end to one of the wheel carrier assemblies, the at least one lower suspension link, or the at least one upper suspension link at either end of the axle.

18. The suspension assembly of claim 17, wherein the ends of the at least one leaf spring are attached either directly or indirectly to the wheel carrier, the at least one upper suspension link, or the at least one lower suspension link.

19. A suspension assembly for a vehicle wheel, comprising:
 a substantially rigid mounting structure attached to a vehicle, wherein the vehicle has an axis of travel;
 a steering carrier assembly attached to the mounting structure;
 at least one upper suspension link with an upper link length generally parallel to the axis of travel of the vehicle, the at least one upper suspension link having a pivot axis generally perpendicular to the axis of travel of the vehicle and enabling the vertical movement of the vehicle wheel;
 at least one lower suspension link with a lower link length generally parallel to the axis of travel of the vehicle, the at least one lower suspension link being spaced below and away from the at least one upper suspension link, having a pivot axis generally perpendicular to the axis of travel of the vehicle, and enabling the vertical movement of the vehicle wheel; and
 a wheel carrier assembly attached to the at least one upper suspension link and the at least one lower suspension link;
 at least one spring; and
 at least one damper,
 wherein at least one of the at least one spring or the at least one damper is attached between two mounting locations comprising the at least one upper suspension link and the at least one lower suspension link, the at least one upper suspension link and the wheel carrier, or the at least one lower suspension link and the wheel carrier, with a difference in motion ratio between the two mounting locations.

20. The suspension assembly of claim 19, wherein the at least one spring is co-incident or co-axial with the at least one damper.

* * * * *